United States Patent
Kalandek

(10) Patent No.: US 8,382,151 B2
(45) Date of Patent: Feb. 26, 2013

(54) EJECTION COUNTERMEASURES FOR CURTAIN AIR BAGS

(75) Inventor: Bruce Andrew Kalandek, Dearborn, MI (US)

(73) Assignee: Key Safety Systems, Inc., Sterling Heights, MI (US)

(*) Notice: Subject to any disclaimer, the term of this patent is extended or adjusted under 35 U.S.C. 154(b) by 0 days.

(21) Appl. No.: 13/442,940

(22) Filed: Apr. 10, 2012

(65) Prior Publication Data

US 2012/0193898 A1  Aug. 2, 2012

Related U.S. Application Data

(63) Continuation of application No. PCT/US2010/054236, filed on Oct. 27, 2010.

(60) Provisional application No. 61/255,581, filed on Oct. 28, 2009.

(51) Int. Cl.
*B60R 21/213* (2011.01)

(52) U.S. Cl. ............... 280/730.2; 280/728.2; 280/730.1

(58) Field of Classification Search ............. 280/730.2, 280/728.2, 730.1, 743.1
See application file for complete search history.

(56) References Cited

U.S. PATENT DOCUMENTS

| | | | | |
|---|---|---|---|---|
| 6,010,149 A * | 1/2000 | Riedel et al. | ............... | 280/730.2 |
| 6,176,515 B1 * | 1/2001 | Wallner et al. | ............. | 280/730.2 |
| 6,224,089 B1 * | 5/2001 | Uchiyama et al. | ......... | 280/728.2 |
| 6,237,941 B1 * | 5/2001 | Bailey et al. | ............... | 280/730.2 |
| 6,338,498 B1 * | 1/2002 | Niederman et al. | ....... | 280/728.2 |
| 6,382,660 B1 * | 5/2002 | Starner et al. | ............. | 280/728.2 |
| 6,450,529 B1 * | 9/2002 | Kalandek et al. | .......... | 280/730.2 |
| 6,626,456 B2 * | 9/2003 | Terbu et al. | ................ | 280/728.2 |
| 6,695,347 B2 * | 2/2004 | Sonnenberg et al. | ...... | 280/743.2 |
| 6,709,008 B2 * | 3/2004 | McGee et al. | ................ | 280/729 |
| 6,758,492 B2 * | 7/2004 | Tesch | .......................... | 280/730.2 |
| 6,796,577 B2 * | 9/2004 | Challa et al. | ............... | 280/730.2 |
| 6,991,255 B2 * | 1/2006 | Henderson et al. | ........ | 280/730.2 |
| 7,278,655 B2 * | 10/2007 | Inoue et al. | ................ | 280/730.2 |
| 7,396,042 B2 * | 7/2008 | Mabuchi et al. | ........... | 280/730.2 |
| 7,404,571 B2 * | 7/2008 | Stevens | ...................... | 280/728.2 |
| 7,422,231 B2 * | 9/2008 | Kismir et al. | ............... | 280/728.1 |
| 7,425,019 B2 * | 9/2008 | Taylor et al. | ............... | 280/730.2 |
| 7,547,038 B2 * | 6/2009 | Coleman | .................... | 280/728.2 |
| 7,614,643 B2 * | 11/2009 | Kismir | ........................ | 280/728.2 |
| 7,810,838 B2 * | 10/2010 | Iwayama et al. | ........... | 280/730.2 |
| 7,837,223 B2 * | 11/2010 | Shilliday et al. | ........... | 280/730.2 |
| 7,963,549 B2 * | 6/2011 | Schneider et al. | ......... | 280/728.2 |
| 8,056,924 B2 * | 11/2011 | Hatfield et al. | ............ | 280/730.2 |
| 8,196,952 B2 * | 6/2012 | Walston et al. | ............ | 280/728.2 |
| 2001/0026062 A1 * | 10/2001 | Kosugi et al. | .............. | 280/730.2 |
| 2004/0232682 A1 * | 11/2004 | Keshavaraj et al. | ........ | 280/743.1 |
| 2005/0082797 A1 | 4/2005 | Welford | | |
| 2005/0230939 A1 * | 10/2005 | Abe et al. | ................... | 280/728.2 |
| 2006/0208466 A1 * | 9/2006 | Kirby | ......................... | 280/730.2 |
| 2008/0238055 A1 | 10/2008 | Hotta | | |

* cited by examiner

*Primary Examiner* — Drew Brown
(74) *Attorney, Agent, or Firm* — Markell Seitzman

(57) ABSTRACT

A curtain air bag (100) for containing an occupant within a vehicle (300), configured to be attached to a corresponding portion of the vehicle (300) above a location of windows (304) in a side (302) of the vehicle (300). Each of the first and second sides (104, 106) are configured to be connected to a respective adjacent first and second pillar of the vehicle (300) at an anchoring location of at or not more than 25 millimeters below the center of gravity of a NHTSA test head form (20) impact location, preferably the inflated portion of the air bag (100) extends well below the anchoring location so that the lower inflated portion of the air bag extends 25 mm or more below the bottom of the test head form (20).

17 Claims, 9 Drawing Sheets

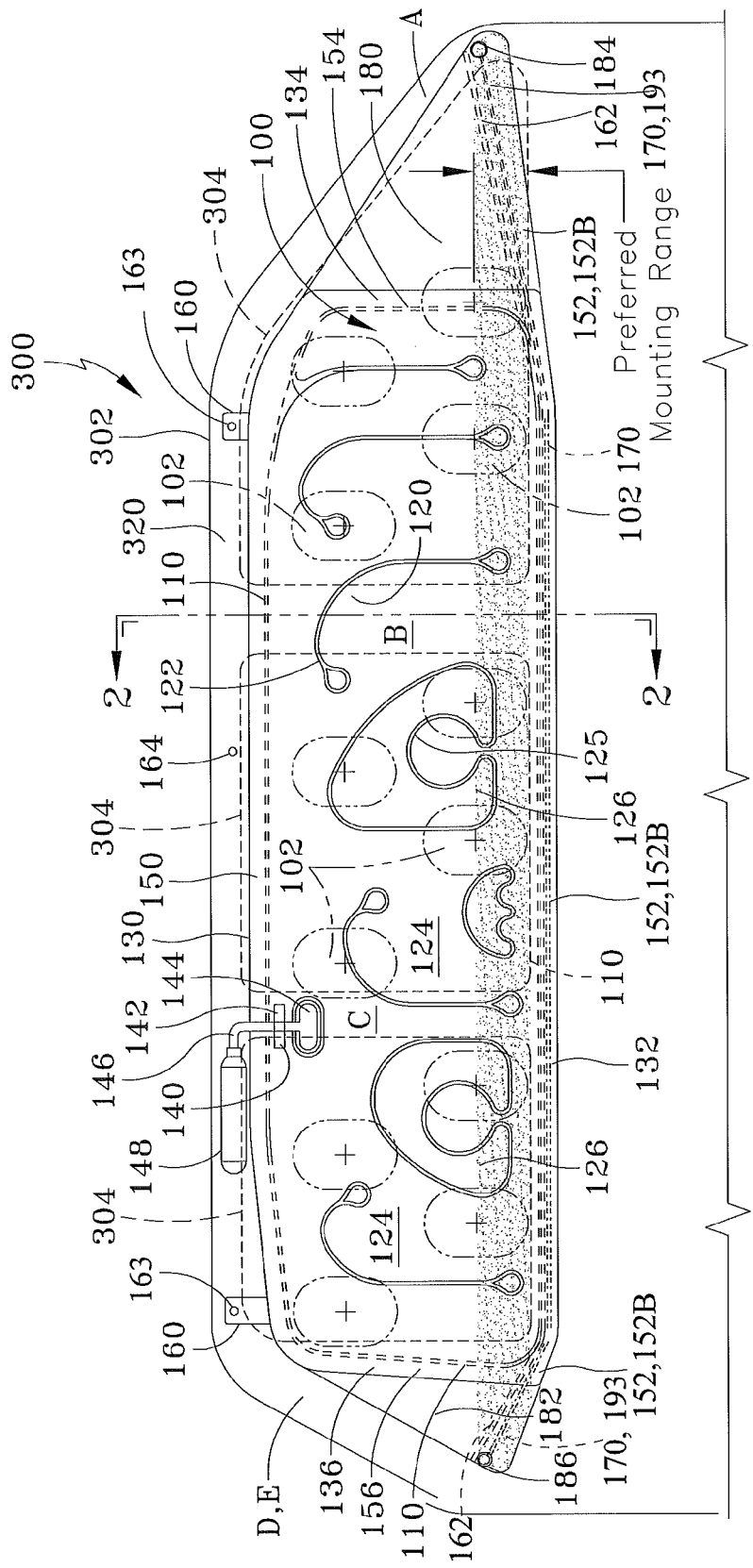

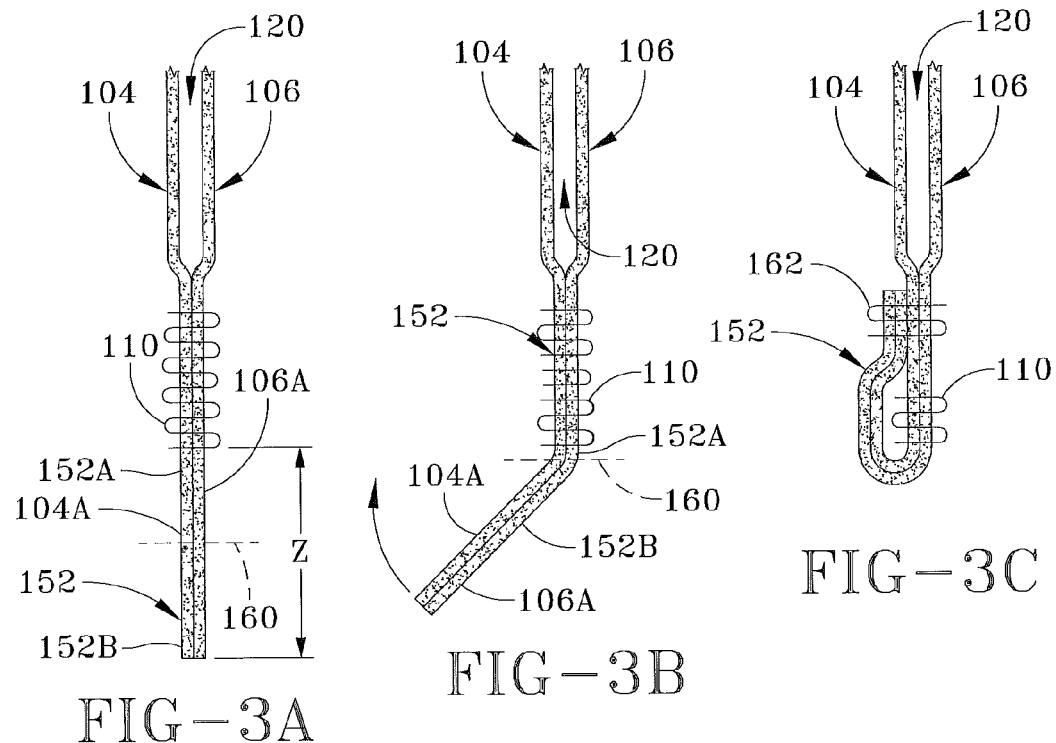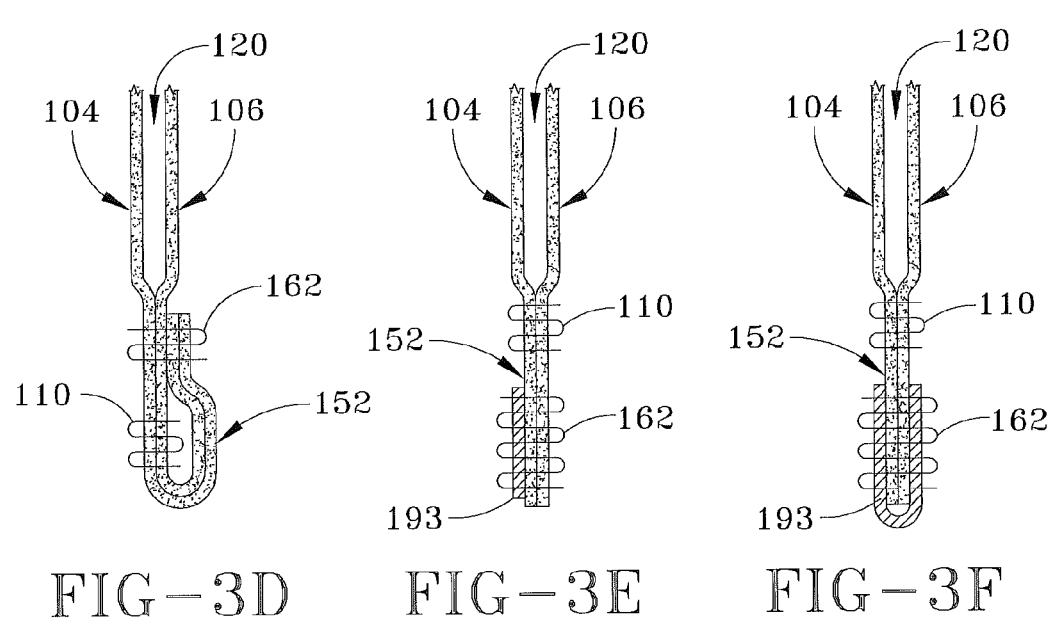

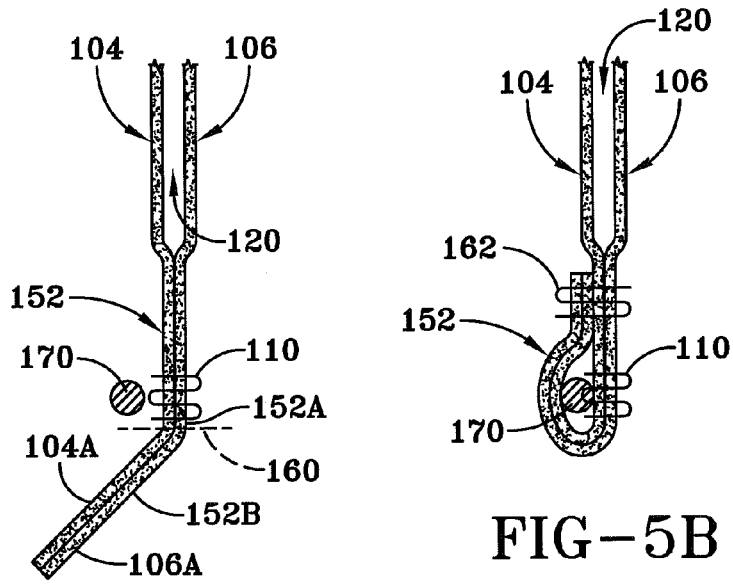
FIG-5A
FIG-5B
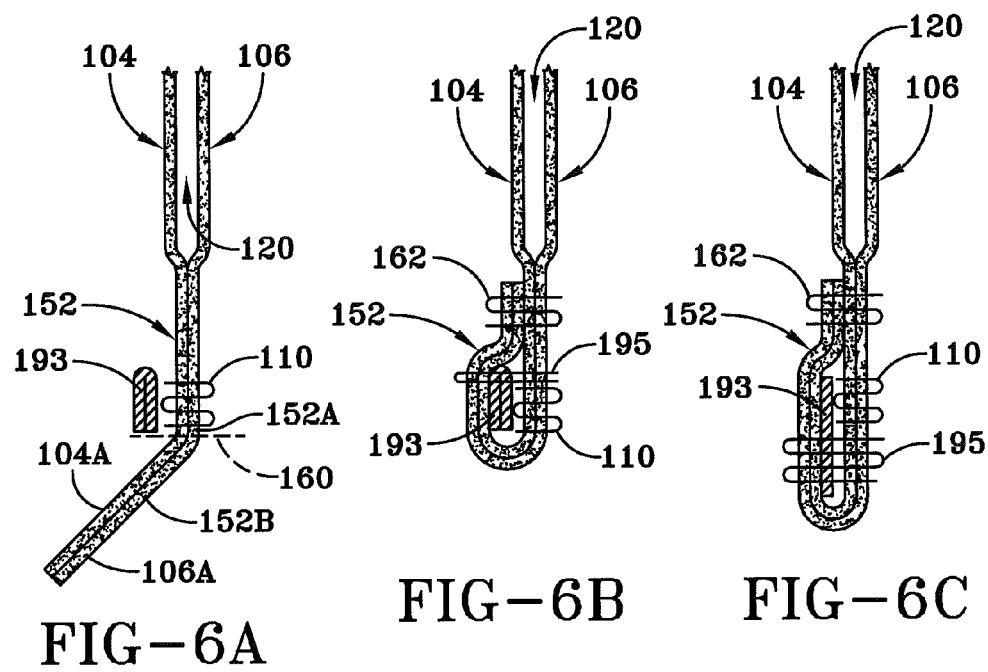
FIG-6A
FIG-6B
FIG-6C

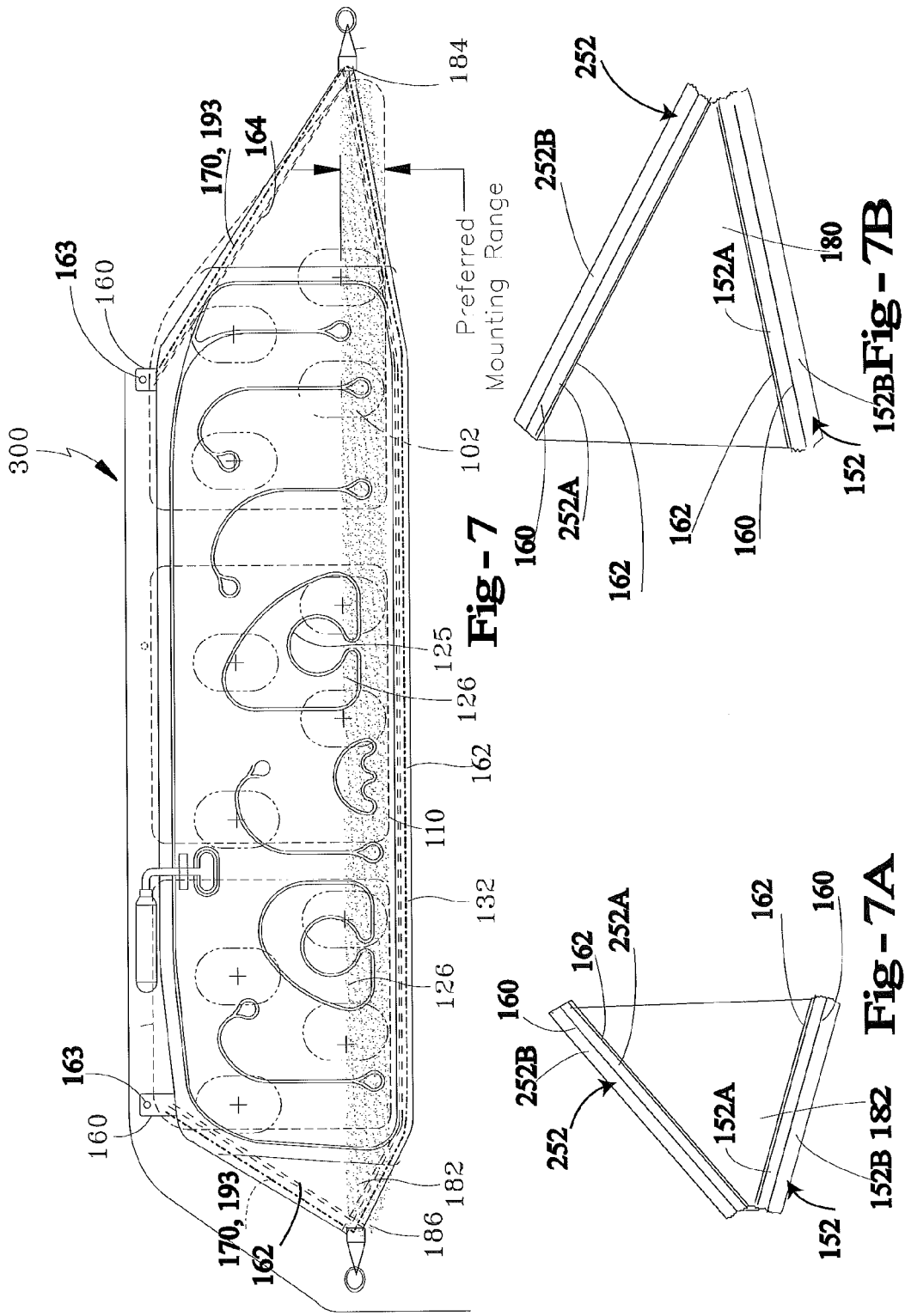

EJECTION COUNTERMEASURES FOR CURTAIN AIR BAGS

RELATED APPLICATIONS

This is a continuation of PCT/US2010/054236 filed on Oct. 27, 2010 which claimed the benefit of U.S. Provisional Application 61/255,581, filed on Oct. 28, 2009. The disclosures of the above applications are incorporated herein by reference.

FIELD OF THE INVENTION

The present invention generally relates to air bags and more particularly to curtain air bags which effectively contain vehicle passengers within the passenger compartment during an accident.

BACKGROUND OF THE INVENTION

The National Traffic Safety Highway Administration (NHTSA) has proposed a new containment test for curtain air bags. This test, as of the initial filing date of this application has yet to be formally established. This test predicts the effectiveness of a curtain air bag when struck by an occupant of a vehicle during an accident involving a side crash or vehicle roll-over event.

The National Highway Traffic Safety Administration (NHTSA) will require automakers to equip all vehicles with side curtain air bags that provide head and torso protection in side-impact crashes by 2013. NHTSA released the new standards stating that the air bags are expected to save 311 lives annually and prevent 361 serious injuries, especially brain injuries, in crashes that often occur when a vehicle runs a stop sign at an intersection.

Transportation Secretary Mary Peters said. NHTSA estimates that the rules will add about $33 to the cost of a vehicle. Side-impact passenger vehicle crashes are often severe. They account for 28 percent of all fatalities, the majority of which involve a brain injury. Safety advocates have long urged NHTSA to require automakers to do more to protect motorists in side crashes. For the first time, NHTSA will also require automakers to provide head protection for rear seat passengers in any crash. The Insurance Institute for Highway Safety has reported that its research demonstrates that head-protecting air bags reduced driver deaths by 52 percent in sport utility vehicles and 37 percent in passenger cars.

NHTSA initially first proposed side-impact standards in May 2004, roughly six months after automakers voluntarily agreed to install side air bags by 2009. Automakers will now have to build vehicles to protect people from side-impact collisions not only with other vehicles but also with stationary objects (such as trees and other objects on the road). Vehicles will be subjected to a tougher performance test including: dynamic pole tests, representing side-impact crashes with stationary objects, vehicle roll-over test and movable deforming barrier (MDB) tests, replicating side-impact crashes with other vehicles. Previously NHTSA tested using only MDB tests.

An added benefit of some head protection air bags is that they help reduce injury and the potential for ejection during a rollover accident. Air bags that have a rollover feature differ from the standard type in two ways. First, the air bag stays inflated longer to compensate for the extended time period in this type of accident, and second, a sensor assesses when a vehicle is about to roll over even if no collision is involved. A typical side-impact crash takes about 60 milliseconds from start to finish, while a rollover collision can last multiple seconds.

Some curtain-style air bags with rollover protection retain about 80 percent of their inflation for about 5 seconds—about three consecutive rolls of a vehicle. Air bags designed for rollover protection are slightly larger than non-rollover curtain designs. Air bag designed for rollover protection typically covers the entire window, which helps to decrease the chances of an occupant being ejected from the vehicle.

Statistics show that vehicle rollovers constitute only 3 percent of passenger vehicle crashes, but they are the most deadly.

These statistics show that the evolution of the side curtain air bag from a primary purpose head injury protection device to a combinational device capable of protecting not only the head but also to mitigate the potential for ejecting an occupant from a vehicle is needed.

The prior art has several side curtain air bags with a tensioning band feature to prevent an occupant from being hurled from a vehicle. U.S. Pat. No. 6,634,671 teaches such a device. The tensioning band feature is positioned in a lower edge of a side curtain air bag and upon air bag deployment the tension band is tightened and later released after about 7 seconds to allow an occupant to escape the vehicle.

The tension band as taught in this prior art is woven externally through holes in the lower fabric of the side curtain air bag.

This design while an improvement does not optimize the overall design of the side curtain air bag and it fails to provide adequate head injury protection.

The present invention as described hereafter provides an improved side curtain air bag with marked improvements in both head injury protection and integrated containment and ejection mitigation countermeasures designed directly into the air bag assembly as well as the inflatable cushion portions of the air bag.

SUMMARY OF THE INVENTION

The present invention includes, a curtain air bag for containing an occupant within a vehicle, comprising: top, bottom and a first side and opposing second side portions linking the top and bottom; the top portion configured to be attached to a corresponding portion of the vehicle above a location of windows in a side of the vehicle, the bottom configured to be disposed, upon deployment of the air bag, proximate a lower edge of the vehicle window, each of the first and second side being configured to be connected to a respective adjacent first and second structure of the vehicle at a location of about, not more than, 25 millimeters above the bottom of the deployed air bag. The invention also identifies various structures to enhance the stiffness of the lower or bottom edge of the air bag.

BRIEF DESCRIPTION OF THE DRAWINGS

The invention will be described by way of example and with reference to the accompanying drawings in which:

FIG. 1A shows a curtain air bag according to the present invention.

FIGS. 3A, 3B, 3C, 3D, 3E and 3F show further details of the bottom or lower edge of the air bag. FIG. 3A is a cross sectional view of the lower portions of the side panels of the air bag as a first embodiment. FIG. 3B is a similar view as 3A in an alternative embodiment. FIG. 3C is an embodiment showing the lower selvage region folded over and sewn together along the bottom of the air bag. While FIGS. 3D, 3E and 3F are further alternatives.

FIGS. 5A, 5B, 6A, 6B and 6C show further embodiments of the present invention.

FIGS. 7, 7A and 7B show an added embodiment of the invention.

DETAILED DESCRIPTION OF THE INVENTION

Figure 1B:
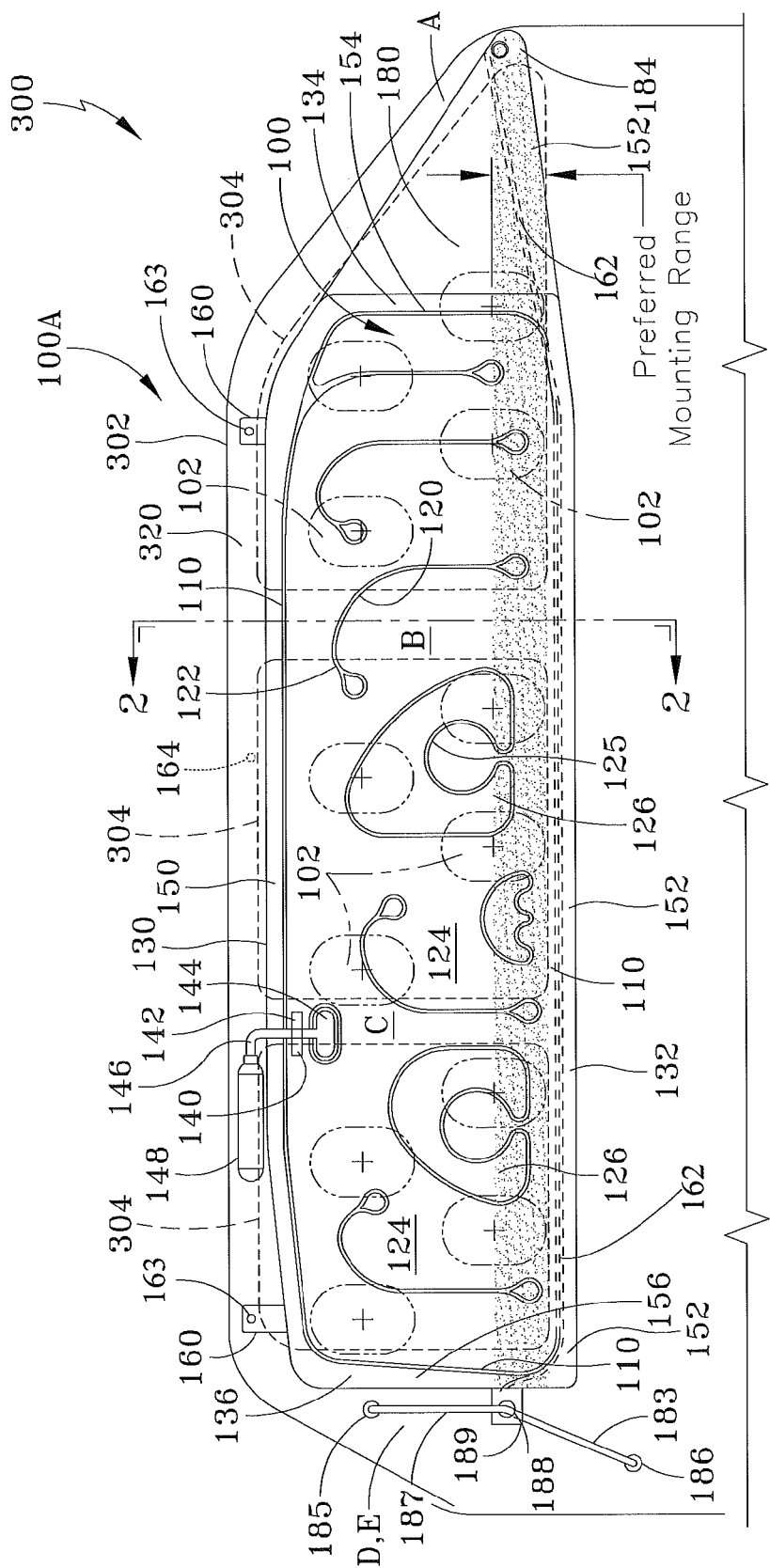
FIG. 1B illustrates an alternate embodiment of the present invention.

FIG. 1A shows curtain air bag 100, which incorporates the present invention. In the illustrated embodiment, the air bag 100 is configured to protect occupants of a large vehicle 300 such as a passenger van or SUV. The air bag 100 is shown in an inflated condition against a side 302 of the vehicle 300. The vehicle side windows are shown by Phantom lines 304. FIG. 1B shows the basically same air bag 100 as FIG. 1A and in an alternative embodiment, both figures include a number of oval icons or FIGS. 102. Each icon 102 represents where a head of a test dummy would impact the air bag at various test-locations corresponding to the NHTSA containment testing procedure.

Figure 2:
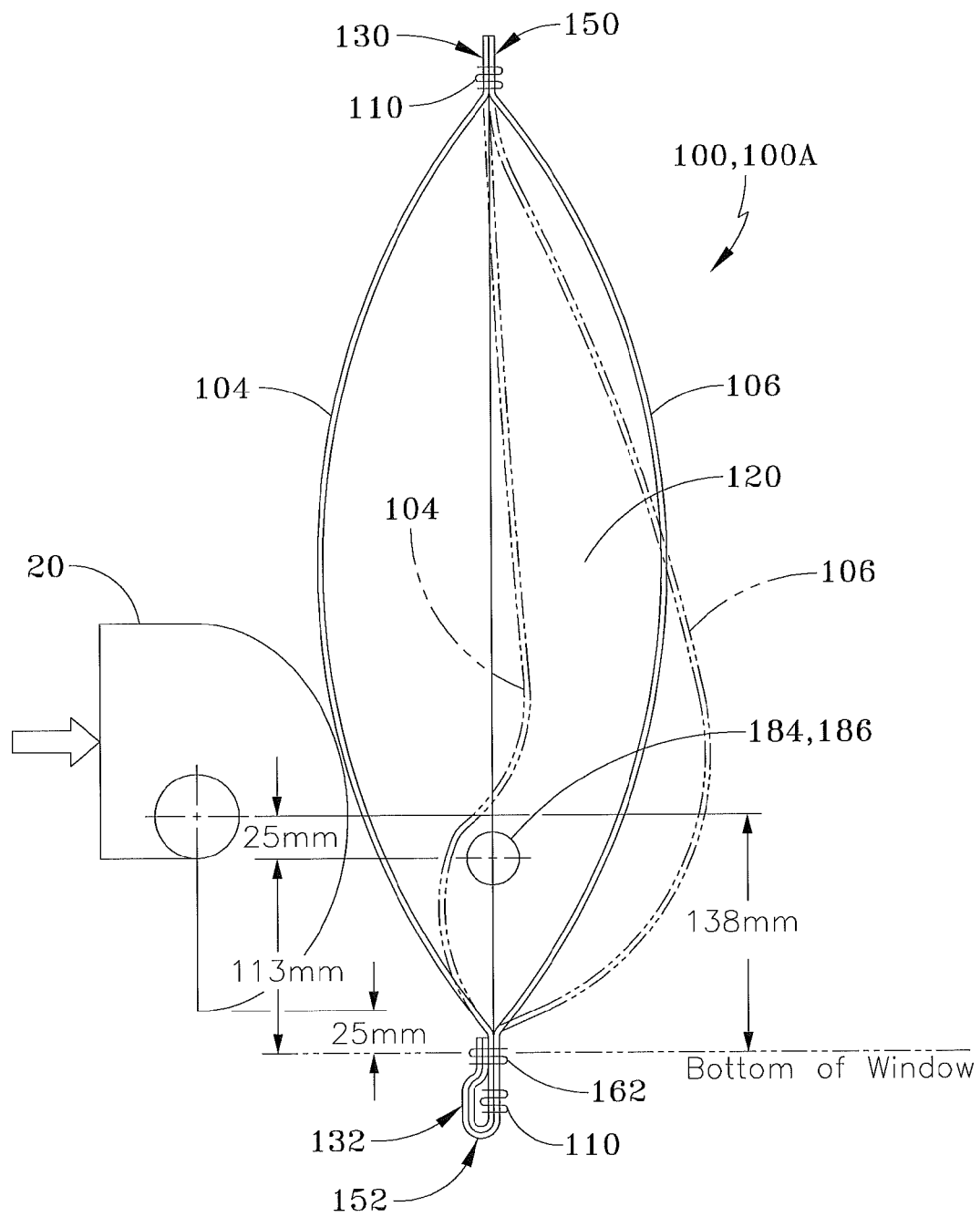
FIG. 2 shows a cross sectional view of the curtain air bag including the present invention taken along lines 2-2 of FIG. 1.

FIGS. 2-6B which show further details of a curtain air bag 100 employing the present invention. FIG. 2 is a cross-sectional view through section 2-2 in FIG. 1A. Air bag 100 includes two opposing panels of material 104 and 106 selectively sewn or woven together as is common in the art. For the purpose of illustration, the illustrated air bag 100 is a sewn-together air bag, however, air bag 100 could be made by various techniques including a technique called a one-piece-woven air bag or an air bag in which the panels are sealed together. Panels 104 and 106 are sewn or otherwise formed or sealed together by one or more peripheral seams such as 110, also shown in FIG. 1A, which extend about the main inflatable region 120 of the air bag. The main inflatable region 120 of the air bag 100 may be subdivided into smaller inflatable regions using a plurality of woven joints, sealed or sewn seam 122. The smaller inflatable regions are referred to by 124. In the context of the present invention the number and position of the smaller inflatable regions is not relevant. As with many curtain air bags, the present invention also includes one or more uninflated regions 126, the periphery of each defined by a woven joint or sewn seam 125. Air bag 100 includes a top 130, bottom 132 and first and second side sides 134 and 136. The air bag 100 includes a way for gas to enter the air bag, this may be accomplished in many different ways. As illustrated air bag 100 includes two gas inlets 140 and 142 which are adapted to receive portions of a T-connector 144 being an inlet connected to an elbow 146 which is connected to an air bag inflator 148 as illustrated in FIGS. 1A and 1B.

The region or regions of panels 104 and 106 outboard of the seam 110 identifies a plurality of various selvage regions 150, 152, 154 and 156. As can be seen, each selvage region 150-154 is located outside of any inflatable region 120 of the air bag 100; as such each selvage region is uninflatable.

Air bag 100 further includes a plurality of mounting members 160. The specific shape and construction of these mounting members 160 is not relevant to the present invention. The mounting members may be constructed as a plurality of tabs 160 that are sewn into or integrally extend from the top selvage region 150 of the air bag 100. Each mounting tab 160 can include an opening 162. Alternately, the mounting member can be formed as a mounting hole 164, shown in phantom line, fabricated within the upper selvage region 150. In this embodiment, the upper selvage region in relation to FIG. 1A is increased in size so that the hole 164 is located proximate the roof rail 320.

The mounting members 160 with openings 162 and/or holes 164 are configured to assist in the mounting of the air bag 100 to a region of the vehicle 300 located above the side windows 304. Typically a curtain air bag will be mounted to the roof rail 320. A plurality of fasteners such as threaded or snap-in fasteners, which are not shown, are received through openings 162 or holes 164 and tightened against the roof rail 320 capturing the mounting member therebetween. The end selvage regions sides 134 and 136 of the air bag 100 are configured to be connected to adjacent pillars of the vehicle 300. As illustrated a first panel 180, shown for example as a triangularly shaped panel, formed as an integral extension or is secured to the end side 134 at the selvage region 154 and secured to the front pillar A of the vehicle 300. Similarly end side 136 is connected to the rear most pillar in the vehicle depending on the vehicle type, either the C-pillar, D-pillar or E-pillar by a second panel 182, which is also for example triangularly shaped secured to an integral extension of the end side selvage region 156 at end 136. In general, each of the first and second panel is shaped so that it covers as much of the window opening as possible. As can be seen in FIG. 1A in the corners are attachment or anchor locations of panels 180 and 182 which can be fastened directly to adjacent portions of the vehicle 300. An anchor 184 or 186 is secured at a respective anchor locations. These anchors can be grommets or tabs with holes or the equivalent.

As illustrated in FIG. 1B, an alternative embodiment side curtain air bag 100A is shown. The air bag 100A as shown has all the features of the air bag 100 but with a different air bag attachment feature in the rear portion of the air bag 100A. In this embodiment a slide rod 187 is used. The rod 187 is bent slightly in a lower portion 183 in such a fashion that as the air bag 100A deploys the lower portion of the air bag is tensioned by the angled rod 187. The slide rod 187 is secured to the rear most pillar either C, D or E at attachments or anchors 185 and 186A as illustrated at the respective anchor locations, the air bag has a tab 189 with an opening 188 through which the slide rod 187 passes allowing the tab 189 to slide freely. As can be seen the location of lower anchor 186 extends rearward further than location of the upper anchor 185. This slide rod 187 is referred to as an external positioning tether (EPT) rod 187. Other than this unique rear attachment aspect air bag 100A has all the features previously described in the air bag 100 of FIG. 1A.

Figure 1C:
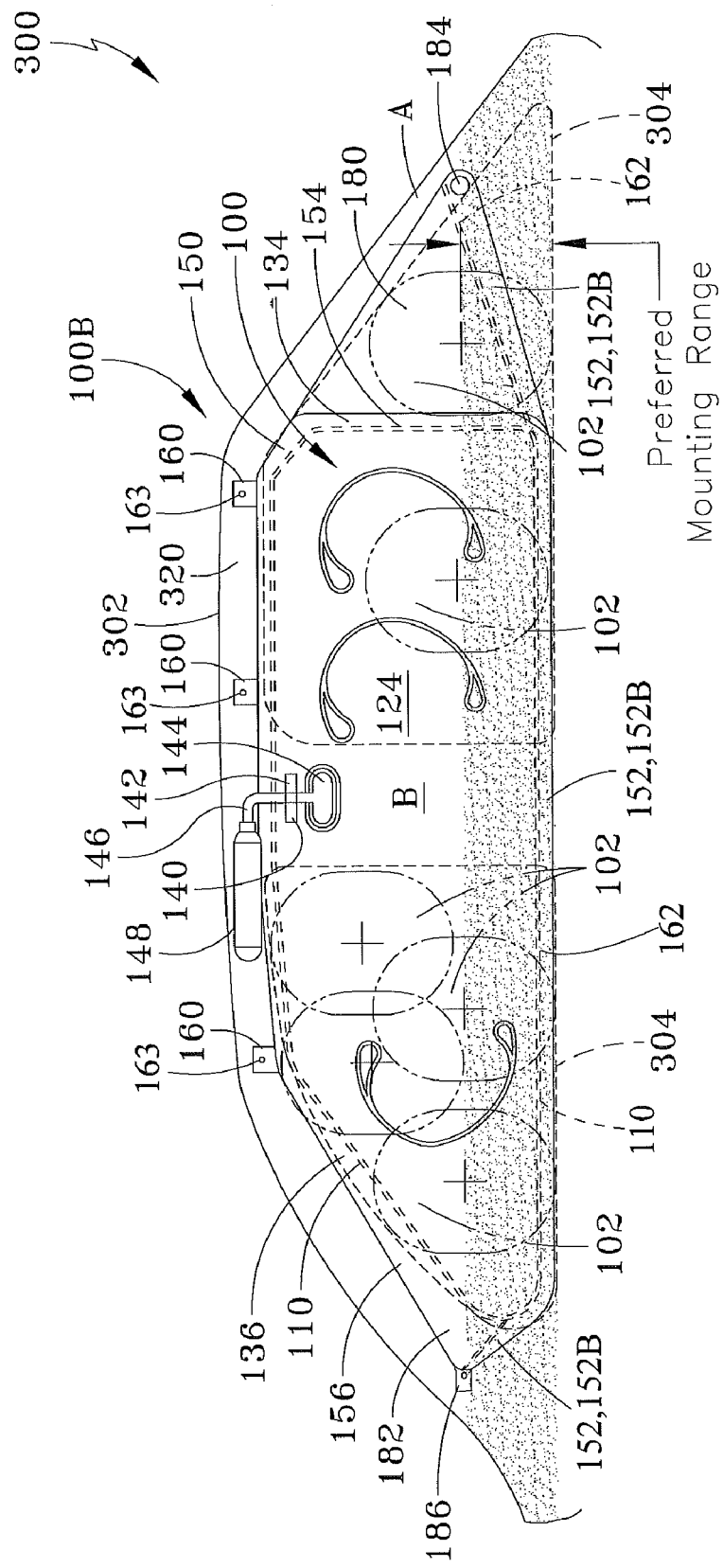
FIG. 1C is a curtain air bag according to the present invention for a passenger vehicle having two rows of seats.

An air bag 100B is illustrated in FIG. 1C for use in a passenger vehicle having two rows of seats. This smaller air bag has basically the same components and features of the air bags 100 and 100A previously discussed but has been modified slightly to accommodate smaller vehicles while still incorporating the ejection countermeasures of the present invention. Air bag 100B covers the two side windows of the vehicle 300 and is anchored between pillars A and C as illustrated by anchors 184 and 186 at attachment locations.

Reference is again made to FIG. 2 which illustrates the relationship between the various panels 104, 106, the peripheral seam 110, the top 130, bottom 132 and selvage regions such as the top selvage region 150 and the lower or bottom selvage region 152. Reference is briefly made to the bottom portion of the air bag 100 or 100A is illustrated in FIG. 2. As can be seen, and the embodiment illustrated, the lower selvage region 152 of the air bag is folded over and stitched to the selvage region 152 by threads 162 effectively stiffening this lower selvage region 152 which creates a reduction in the elongation of the air bag 100 or 100A. The stiffened selvage region 152 extends through to the lateral anchor 184 and 186. The anchors at the anchor can be grommets or tabs with holes to receive a fastener. FIG. 2 also shows in phantom line how air bag 100 or 100A will deform when loaded by a NHTSA head form 20 also referred to below which is representative of a vehicle occupant.

Reference is made to FIGS. 3A, 3B and 3C which illustrate further details of the present invention. FIG. 3A is a cross-sectional view showing panels 104 and 106. Additionally, the lower portions of these panels are referred to by numerals 104A and 106A which are located below the lower peripheral seam 110. As can be recognized, the lower portions of these panels 104A and 106A are the lower selvage region 152. Peripheral seam 110 separates the inflatable portions of the air bag 100 designated by numerals 120 from the selvage regions 150, 152. As can be appreciated, if the air bag 100 were made of a one-piece woven technique the lower peripheral seam 110 would be replaced by a region where the two lower ends of panels 104 and 106 are integrally woven together thereby also forming the lower selvage region 152.

Reference is made to the low portion of FIG. 3A. As can be seen the lower selvage region 152 has been divided into an upper first section 152A, a lower second region 152B and a fold line 160. In the embodiment shown in FIGS. 3A and 3B, fold line 160 is positioned slightly below the lower peripheral seam 110 and the selvage portions 152A and 152B extend a distance Z of at least 15 mm from the seam 110. The lower second region 152B is folded over fold line 160 and is positioned above peripheral seam 110. Subsequently the lower second selvage region 152B is sewn through panels 104 and 106 by a seam 162 at a location above that of peripheral seam 110 as shown in FIG. 3C. FIG. 3D shows a further alternate embodiment in which the selvage region is folded over in an opposite direction.

Figure 4A:
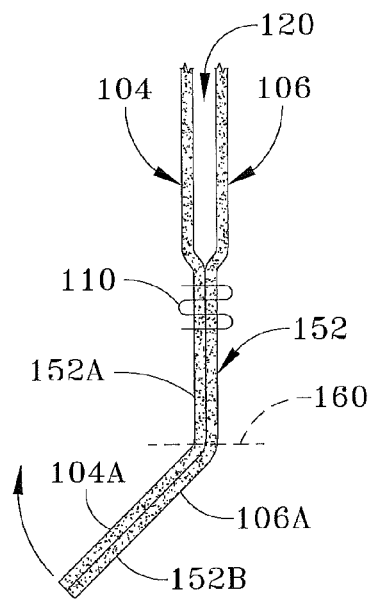
FIGS. 4A, 4B, 4C, 4D, 4E and 4F show additional alternate embodiments of the present invention.
Figure 4B:
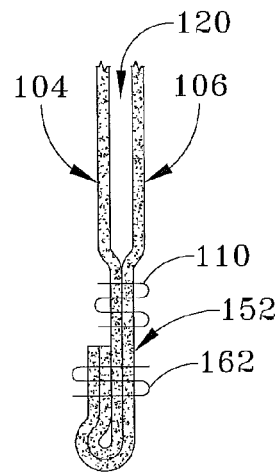

Reference is briefly made to FIGS. 4A and 4B which show an alternate embodiment of the present invention. In FIG. 4A fold line 160 is positioned further away from seam 110. The lower second selvage region 152B as before it is folded over fold line 160 in a first direction. In this alternate embodiment however, the lower selvage region 152B is sewn to the upper selvage region 152A by seam 162 at a location below that of the location of seam 110 as illustrated in FIG. 4B. Instead of folding over the selvage to create multiple layers, a strip of material 193, as shown in FIG. 3E, having an elongation rate equal to or less than that of the selvage region can be sewn to the selvage region 152. Alternatively, a wider strip 193 can be folded over the selvage region 152 and sewn with threads 162 as shown in FIG. 3F thus making the strip 193 two thickness layers. Experience has shown that a cost effective width of a selvage region is about 30 mm.

Figure 4C:
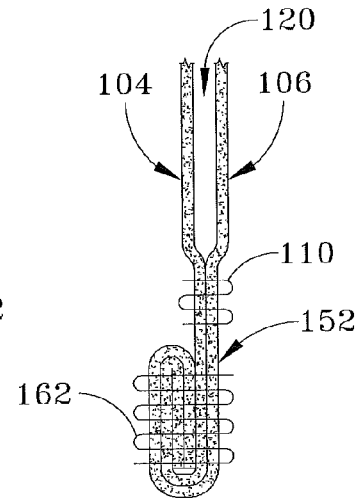
Figure 4D:
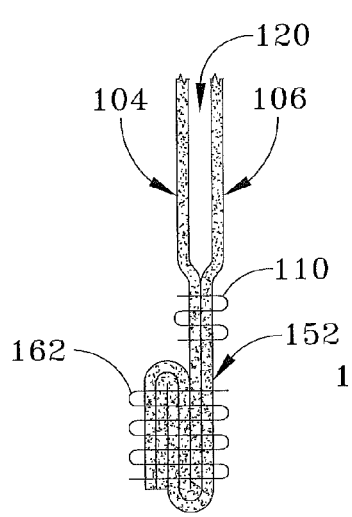
Figure 4E:
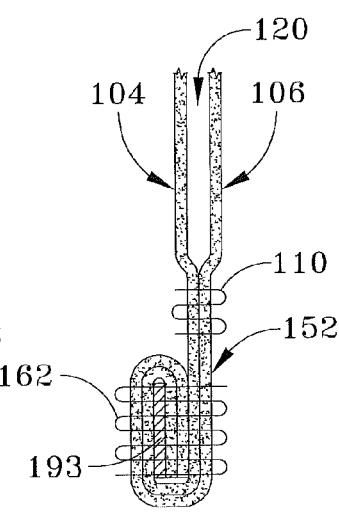
Figure 4F:
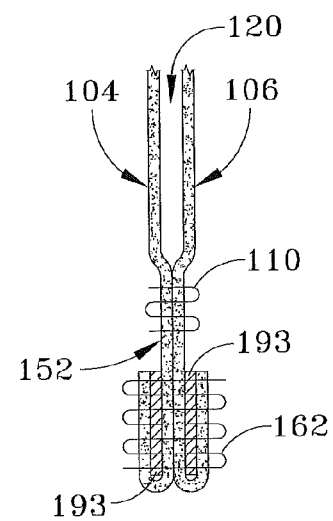

In a further alternate embodiment, the width of the selvage region can be multiples of this dimension and rolled, folded or pleated to create the multiple layers as shown in FIGS. 4C and 4D. In FIG. 4E this concept modifies the embodiment of 4C by adding a single strip 193 inside a multiple fold. In a still further embodiment, FIG. 4F shows the lower selvage region 152 with the panel 104 folded about a strip 193 and the panel 106 folded in an opposite direction about a second strip 193 and sewn together with threads 162. All of these embodiments have the goal to stiffen this lower region 152 to provide superior occupant containment.

As can be appreciated from the above, by folding over the lower selvage region 152B and securing it to adjacent portions 152 of the air bag 100 has the effect of reducing the elongation of the lower portion of the air bag 100 greater than if the selvage region 152 was not folded over. The reduced elongation capacity of the air bag provides an effective countermeasure to occupant ejection through an open window.

FIGS. 5A and 5B, as well as a FIG. 6A, 6B and 6C show further alternate, though related, embodiments of the present invention. In general in these embodiments, an object is encapsulated in the folded selvage region, to reduce the elongation of the lower perimeter of the air bag as compared to the air bag in its unaltered or native state wherein the panels 104 and 106 would normally be sewn together, but not folded or otherwise reinforced. In FIG. 5A a flexible rope, or wire or flat or rolled woven material such as a seat belt or a non-woven material 170 is positioned above fold line 160 adjacent panel 104. Subsequently, the lower selvage region 152 is folded about the fold line 160 enveloping the rope or wire 170 as illustrated in FIG. 5B. As with the above embodiments the lower selvage region 152B is secured to the air bag by a seam 162. Seam 162 is further located close to the rope, wire, belt or material 170 thereby fixing the rope or wire 170 at the fold line 160 in the bottom 132 of air bag 100.

Reference is briefly made to FIGS. 6A and 6B. In these figures a length of woven fabric such as a seat belt webbing 193 is positioned adjacent fold line 160. If the webbing 193 is sufficiently thick it need not be folded over, however, to further increase the stiffness provided by a webbing 193, the webbing can be folded over its self as also illustrated in FIG. 6A. The webbing 193, folded over or not, is placed adjacent fold line 160 and the selvage region 152 is folded over and enveloping the webbing 193 and sewn to the sides 104, 106 by seam 162 as shown in the same manner as mentioned above. Alternatively, as shown in FIG. 6B, a sewn seam such as 195 sewing the webbing 193 directly to the air bag 100 or 100A. During a side collision, the occupant of the vehicle will load the inflated air bag 100 or 100A. The now stiffer selvage region 152 with the fold-over portions 152A and 152B with or without the rope, wire 170 or seat belt webbing 193 greatly reduces the elongation of the deployed inflated air bag and is more effective in containing the occupant within the passenger compartment of the vehicle 300 than an air bag without a stiffened lower region 152. The ends of the wire or rope 170 or the seat belt webbing extend to a respective anchor 184 and 186.

An extremely critical aspect of the present invention side curtain air bag 100, 100A or 100B is the strategic positioning of the inflated target regions 102 of the air bag 100, 100A or 100B. These target regions 102 represent areas of the air bag most likely to receive a head impact upon a side impact or rollover condition. Each of the selvage constructions in FIGS. 3A-6C can be embodied in the lower portions of the side panels 180 and 182.

A curtain air bag 100, 100A or 100B is specifically designed to constrain a vehicle occupant within a vehicle 300. The air bag 100, 100A or 100B is configured to receive a test head form 20 at a target location 102 near the bottom of a window 304 on the side of the vehicle 300 as shown in FIG. 2. The head form 20 has a center of gravity CG. A low portion of the target location 102 is offset a distance of 25 mm or more from the stiffened selvage region 152 of the air bag 100. The air bag 100 has a top 130 configured to be attached to a roof rail 320 of the vehicle 300 above the location of windows 304 in a side 302 of the vehicle 300, a bottom 132 configured to be disposed proximate a lower edge of the vehicle window 304 upon deployment of the air bag 100, a first and a second side 134, 136 linking the top and bottom, each side being configured to be connected, via panels 180 and 182, to a respective adjacent structure of the vehicle 300 in fore and aft directions at a location that is not higher than 138 mm above the beltline of the windows, that is, the lower portion of the window openings of the vehicle. Preferably, the attachment locations are located at the CG or up to 25 mm below the CG of the impact point of the NHTSA test head form 20. This configuration has shown to beneficially protect both adults and children.

The curtain air bag preferably the bottom of the air bag 100 is reinforced as described in the various embodiments previously shown in FIGS. 3A through 6C.

The curtain air bag has a bottom 132 of the air bag 100, 100A or 100B which includes selvage 152 below an inflatable portion 120 of the air bag 100, 100A or 100B. The selvage 152 includes a first selvage part 152A below an inflatable portion 120 of the air bag 100 and a second selvage part 152B below the first selvage part 152A, wherein the second selvage part 152B is folded-over or rolled-over the first selvage part 152A, forming a fold or roll, and the first and second selvage parts 152A and 152B are sewn together or otherwise attached to together thereby reinforcing the bottom of the air bag 100 and decrease the elongation of the lower extreme of the air bag which essentially includes the overall the stiffness of the bottom 132 of the air bag 100.

A stiffening member 170 or 193 can be placed in the fold prior to securing the first and second selvage parts 152A and 152B together.

The stiffening member 170 or 193 preferably is positioned proximate the bottom of the fold 160 and a seam 162 that fastens the first and second selvage parts 152A and 152B together also maintains the stiffening member 170 or 193 generally securely fixed at the bottom of the fold 160. Ends of each stiffening member can be secured at adjacent anchor such as 184 and 186. The stiffening members 170 and 193 preferably also extend along the fold 162 placed at the bottom of each side panel 180 and 182.

The stiffening member as mentioned above, can be one of a length of rope or wire 170 or woven fabric or webbing 193 (that is pleated, rolled, folded or attached for example by sewing, gluing, sonic welding or other similar means).

As previously mentioned, the curtain air bag 100, 100A or 100B for containing an occupant within a vehicle preferably has a top 130, bottom 132 and a first 134 and opposing second 136 side portions linking the top and bottom. The top portion is configured to be attached to a corresponding portion of the vehicle 300 above a location of windows 304 in a side of the vehicle, the bottom 132 configured to be disposed, upon deployment of the air bag, proximate to a lower edge of the vehicle window 304. Each of the first and second side portions 104, 106 is configured to be connected to a respective adjacent first and second structure of the vehicle 300 at an anchoring location X greater than or equal to 25 millimeters below the center-of-gravity of a NHTSA test head form impact location. Ideally the anchoring location is positioned such that it lies at least 113 mm above the lowest part of the window opening. The 113 mm level for illustrative purposes is located at the top of the preferred mounting range as shown in the figures.

In this air bag 100 the stiffened lower portion of the deployed and inflated air bag will be well below the vehicle occupant's head and neck during a rollover condition which should enable the head to impact above both the anchoring location and the stiffened bottom of the air bag 100. The anchoring locations for anchors 184 and 186 being at or near the lateral ends of the air bag 100 keeps the occupant contained from being ejected while the stiffened lower portions of the air bag provide additional strength keeping the occupant from being ejected regardless of the amount of inflation pressure left in the air bag 100 should the air bag be cut or prematurely torn during the crash event.

As shown in the shaded region of Figs. 1A and 1B the optimal location of the anchoring locations is illustrated proximate the top pf the preferred mounting range, however the anchors can be located anywhere within the preferred mounting range. In addition once the anchoring locations are fixed the location of the stiffened bottom can be established to insure the inflated portion of the side curtain air bag extends a distance of at least 25 mm beyond the lower portion of an impacting head. This relationship insures the occupants head will ideally impact on the inflated portion of the air bag above the stiffened lower portion.

Figure 2A:
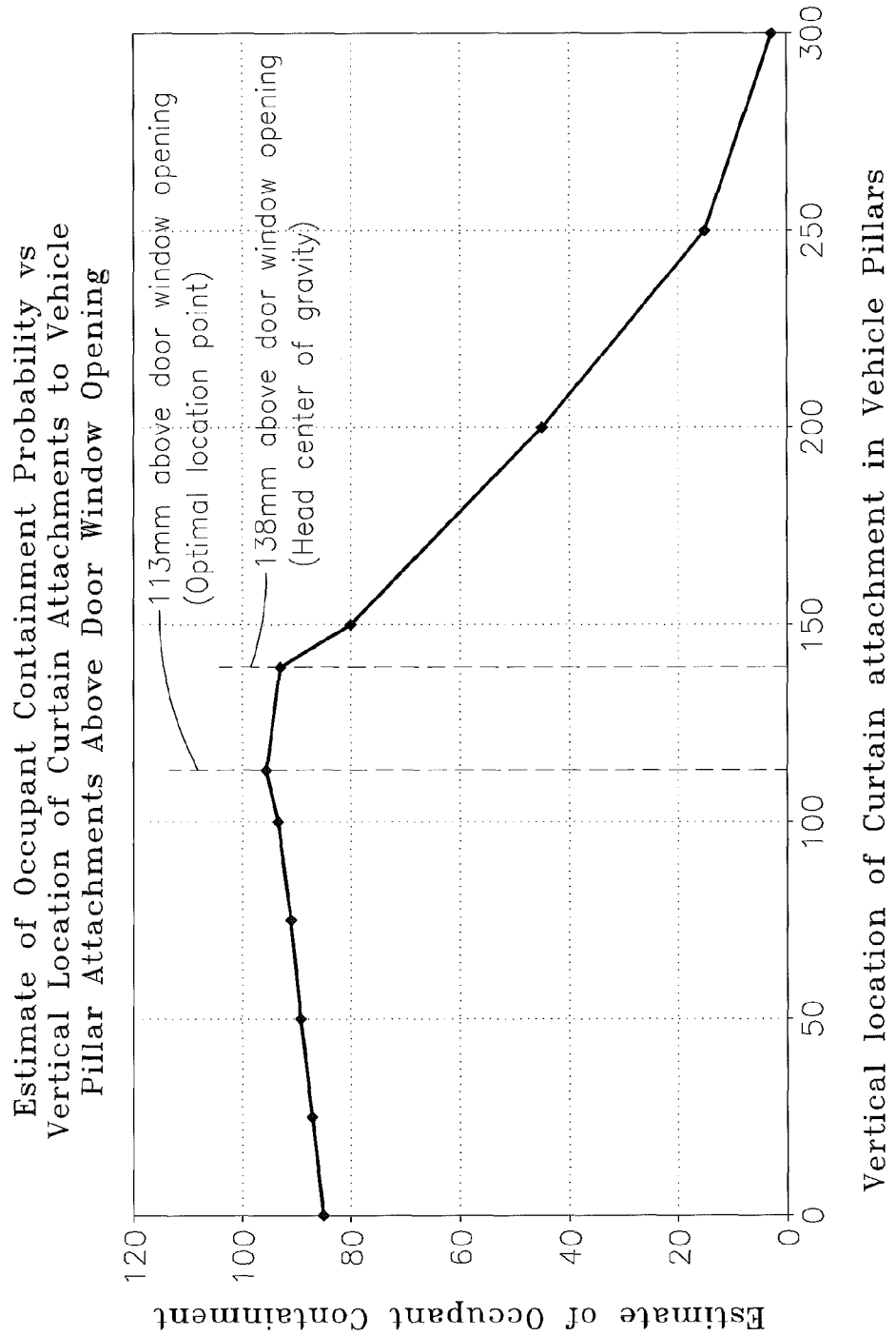
FIG. 2A shows a chart with an estimated probability of containment vs. the vertical location of the air bag curtain attachment to the vehicle as measured from the bottom of the side window openings.

To explain the inventive concept of the strategic positioning of the anchoring or curtain attachment in the vehicle pillars is shown in the chart of FIG. 2A. In this chart the containment probability reaches a peak when the anchor locations are set at 113 mm over the lowest portion of the window opening commonly referred to as the belt line. As the anchor locations are moved up to 138 mm above the opening, which corresponds to the location of the CG of the test form head 20, no significant drop off in containment occurs, however, as the anchor location exceeds this distance the containment drops off quickly. Interestingly anchoring locations below this 113 mm location are inferior in containment. This means having the anchors at or below the window opening provides no advantage to containment and in fact slightly, but nonetheless significantly reduces the containment probability as well as increases the cost of the air bag.

While the stiffened lower or bottom selvage regions 152 were only shown as stiffened in the present invention, it is possible that all ends 152, 154, 156 along the perimeter seam 110 could be stiffened. The top portions being secured along the roof rail likely need no additional stiffening however the forward and rearward ends of the air bag can be similarly stiffened as described above if so desired. As such the air bag 100 or 100A could have additional stiffening along the perimeter adjacent the inflated portions if so desired without departing from the intention to stiffen the lower portion of the deployed side curtain air bag.

FIG. 7 shows another air bag 100C with stiffened portions running along the outside side edges 154A and 156A of each panel 180 and 182. The bag 100C can also include the anti-elongation members as well. FIGS. 7A and 7B show the construction of typical side panels 180 and 182. As mentioned above, each side panel 180 and 182 can include the lower selvage region also referred to by numeral 152 with selvage regions 152A and 152B. FIGS. 7A and 7B also show the fold line 160 as well as that portion of seam 162 used to secure portions 152A and 152B of the panel 180 and 182 together. Air bag 100C departs from the air bags described above by including an enlarged upper selvage region 252 similar in function to the lower selvage region 152. The reinforced selvage region 262 forming the upper edge of both panels 180 and 182 provide enhanced protection for the occupant. As the air bag inflates this upper edge is tensioned. Selvage region 252 is divided into portions 252A and 252B. Portion 252B is folded over fold line 160 and sewn or otherwise secured such using seam 162, to portion 252A in the manner selvage regions 152A and 152B are secured by seam 162. Any of the anti-elongations members such as 170 and 193 mentioned above can extend through the hem formed by the folded-over portions of the upper and lower selvage regions. The anti-elongation member which is within the folded over selvage region 152 can in one embodiment terminate at the respective lower anchor 184 or 186. For example, an upper anti-elongation member such as 170 or 193 can be positioned within the folded-over portions of the upper selvage region 252 and extend from anchors 184 or 186 to a corresponding tab 160. The anti-elongation member 170 and 192 in the lower folded-over selvage 152 can extend through the lower anchor 184 or 186 and continue up to the respective upper tab 160. FIG. 7 also shows alternate lateral anchors 184 and 186 which comprise a tab secured to a panel 184 and 186 and a ring 256 secured to the tab.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A curtain air bag (100, 100A) to constrain a vehicle occupant within a vehicle (300), the air bag configured to receive a test head form (20) at a target location near the bottom of a window (304) on the side of the vehicle, the head form having a center of gravity CG, a low portion of the target location being offset from the bottom of the inflated portion of the air bag comprising:

a top (130) configured to be attached to a roof rail (320) of the vehicle (300) above the location of windows in a side of the vehicle, a bottom (132) configured to be disposed proximate a lower edge of the vehicle window upon deployment of the air bag, a first and a second side (104, 106) linking the top and bottom, each side having a lateral end (180 or 182) being configured to be connected at anchoring locations (184, 186) at the lateral ends (180, 182) of the curtain airbag (100) to a respective adjacent first and second pillars of the vehicle at a vertical location X at or 25 mm below an impact point of the center of gravity of the head form, wherein the anchor locations are set above the lowest portion of the window opening; and wherein the bottom of the air bag is reinforced and the anchor locations are set between 113 mm to 138 mm above the lowest portion of the window opening and the inflated portion of the airbag extends at least 25 mm beyond the lower portion of impacting test head to a reinforced bottom (132) of the curtain airbag (100), the reinforced bottom (132) extends through to the lateral anchors (184 and 186) along the entire length of the airbag.

2. The curtain air bag according to claim 1 wherein the elongation of the bottom of the air bag is reduced from the elongation of the air bag above the reinforced bottom (132).

3. The curtain air bag according to claim 2 wherein the bottom of the air bag includes selvage (150-156) below an inflatable portion of the air bag, the selvage including a first selvage part below an inflatable portion of the air bag (120) and a second selvage part below the first selvage part, wherein the second selvage part is reinforced by addition of another layer of material or where the selvage part is folded over or rolled over the first selvage part, forming a fold or roll, and the first and second selvage parts are sewn together or otherwise attached together thereby reinforcing the bottom of the air bag to reduce the elongation of the air bag along the outer perimeter.

4. The curtain air bag according to claim 3 wherein a stiffening member (170, 193) is placed in the fold prior to securing the first and second selvage parts together.

5. The curtain air bag according to claim 4 wherein the stiffening member is positioned proximate the bottom of the fold and a seam that fastens the first and second selvage parts together also maintains the stiffening member generally at the bottom of the fold.

6. The curtain air bag according to claim 5 wherein the stiffening member is one of a length of rope, wire or woven fabric or webbing, having ends secured at anchors (184 and 186).

7. The curtain air bag according to claim 1 wherein the air bag includes opposing sides (154A, 156A) which are reinforced to reduce the elongation of each side of the air bag below that of the elongation of the air bag above the reinforced bottom (132).

8. The curtain air bag according to claim 7 wherein the bottom of the air bag includes a first side selvage (252) at a side (154A-156A) of an inflatable portion of the air bag, the first side selvage extending from an anchor along the top of the air bag to an anchor (184, 186) along a side of the air bag, wherein the first side selvage part is reinforced by the addition of another layer of material or where the selvage part is folded over or rolled over the first side selvage part, forming a fold or roll, and the first side selvage part sewn together or otherwise attached together thereby reinforcing the side of the air bag to the elongation of a respective side of the air bag.

9. The curtain air bag according to claim 8 wherein a stiffening member including one of a length of rope, wire or woven fabric or webbing is located within the folded-over first side selvage region and extending to and secured at anchors (184 and 186).

10. A curtain air bag (100, 100A) for containing an occupant within a vehicle (300), comprising:

top (130), bottom (132) and first and opposing second side (104, 106) portions linking the top and bottom;

the top portion configured to be attached to a corresponding portion of the vehicle above a location of windows (304) in a side of the vehicle, the bottom configured to be disposed, upon deployment of the air bag, proximate a lower edge of the vehicle window, each of the first and second side having a lateral end (180 or 182) being configured to be connected at an anchoring location (184, 186) at the lateral ends (180, 182) of the curtain airbag (100, 100A) to a respective adjacent first and second pillar of the vehicle at a location X at or not more than 25 mm below the center-of-gravity of a NHTSA test head form (20) impact at a location 113 mm or more above the bottom of the vehicle window opening, wherein the bottom portion of the inflated portion of the air bag extends to a stiffened bottom folded edge portion, the stiffened bottom folded edge portion being located a distance Y, of 25 mm or more from a lower portion of the head form; and wherein the bottom of the air bag is reinforced, the reinforced bottom (132) extends through to the lateral anchors (184 and 186) along the entire length of the airbag.

11. The curtain air bag according to claim 10 wherein bottom of the air bag includes selvage below an inflatable portion of the air bag, the selvage including a first selvage part below an inflatable portion of the air bag and a second selvage part below the first selvage part, wherein the second selvage part is folded over or rolled over the first selvage part, forming a fold or roll, and the first and second selvage parts sewn together or otherwise attached together thereby reinforcing the bottom of the air bag and reducing the elongation of the bottom of the air bag along the outer perimeter.

12. The curtain air bag according to claim 11 wherein a stiffening member is placed in the fold prior to securing the first and second selvage parts together.

13. The curtain air bag according to claim 12 wherein the stiffening member is positioned proximate the bottom of the fold and a seam that fastens the first and second selvage parts together also maintains the stiffening member generally near the bottom of the fold.

14. The curtain air bag according to claim 13 wherein the stiffening member is one of a length of rope, wire or woven fabric or webbing.

15. The curtain air bag according to claim 14 wherein the air bag includes opposing sides (154A, 156A) which are reinforced to reduce the elongation of each side of the air bag below that of the elongation of the air bag between the sides and above the reinforced bottom (132).

16. The curtain air bag according to claim 15 wherein bottom of the air bag includes a first side selvage (252) at a side (154A-156A) of an inflatable portion of the air bag, the first side selvage extending from an anchor along the top of the air bag to an anchor (184, 186) along a side of the air bag, wherein the first side selvage part is reinforced by the addition of another layer of material or where the selvage part is folded over or rolled over the first side selvage part, forming a fold or roll, and the first side selvage part sewn together or otherwise attached together thereby reinforcing the side of the air bag to the elongation of a respective side of the air bag.

17. The curtain air bag according to claim 16 wherein a stiffening member including one of a length of rope, wire or woven fabric or webbing is located within the folded-over first side selvage region.

* * * * *